April 12, 1938. H. A. FLOGAUS 2,113,616
BUMPER
Filed Oct. 28, 1936
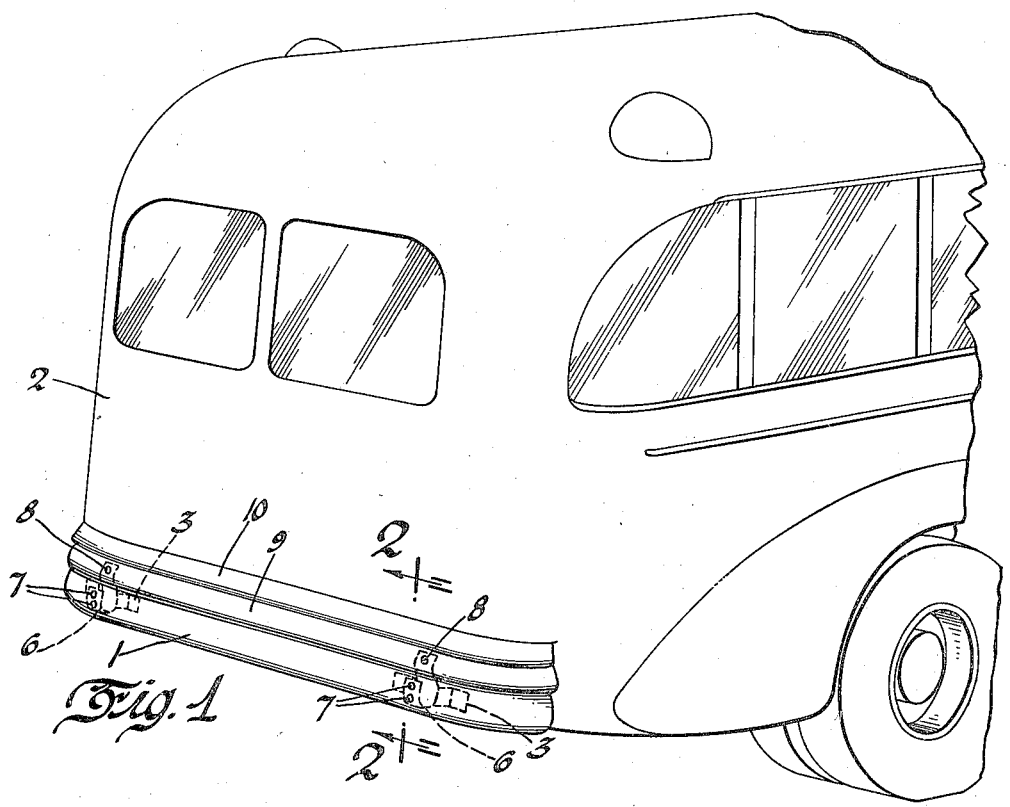
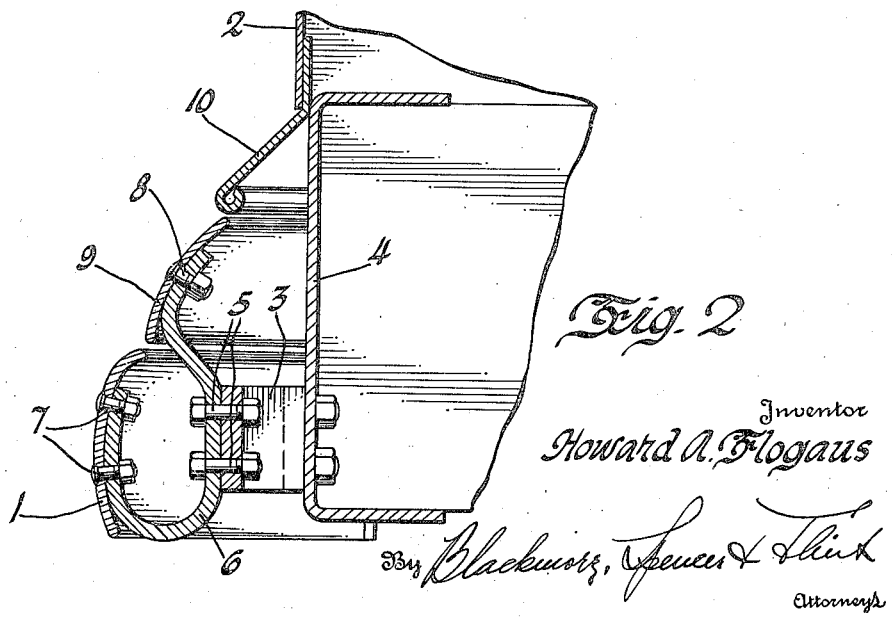
Inventor
Howard A. Flogaus
By Blackmore, Spencer & Flint
Attorneys Patented Apr. 12, 1938

2,113,616

UNITED STATES PATENT OFFICE 2,113,616

BUMPER

Howard A. Flogaus, Pleasant Ridge, Mich., assignor to Yellow Truck and Coach Manufacturing Company, Pontiac, Mich., a corporation of Maine Application October 28, 1936, Serial No. 107,925

4 Claims. (Cl. 293—55)

This invention relates to motor vehicles and to an improvement in collision bumpers.

It is an object of the invention to provide a construction especially adapted for use at the rear of motor coaches to prevent and discourage attempts of children or other persons to indulge in the dangerous practice of unauthorized riding on parts projecting beyond the exterior walls of the vehicle. Accordingly it is proposed to shield the top of the bumper, which necessarily extends beyond the wall of the body to be protected, so that no convenient foothold is afforded.

More particularly the aim of the present invention is to provide an impact cushioning bumper which has a large range of movement under impact before the striking object contacts with the fixed parts of the vehicle wherefore the likelihood of damage is largely eliminated and bumps are confined to the face of the bumper bar. In one embodiment, as hereinafter described in more detail, a two-part shield covers the space between the bumper and the body and presents an inclined exposed face with parts mounted, respectively, on the bumper and the body for free relative movement upon bumper deflection. With this arrangement of the inclined shield no foothold is afforded in the normal position of the bumper and an impact may deflect the bumper, carrying one of the shield parts with it, through a relatively large range of travel before the fixed part of the shield or other parts of the body are struck.

This preferred embodiment is illustrated in the accompanying drawing wherein Figure 1 is a perspective view showing the rear end of a motor coach with the present invention applied thereto and Figure 2 is an enlarged sectional view taken on line 2—2 of Figure 1.

Any of the conventional flexible bar bumpers may be incorporated in the structure, there being shown in the drawing for the sake of simplicity a relatively wide bar 1, preferably of chromium plated spring steel, to be resiliently supported at the rear of the vehicle in outwardly spaced relation with and across the bottom of the rear wall 2 of the vehicle body. The arched spring mounting bracket 3 is bolted or otherwise secured to the rear transverse framing member 4 and mounts as by bolts or studs 5 the intermediate portion of an S-shaped supporting spring 6, one leg of which is bent out and upwardly for attachment by bolts 7 to the impact bar 1. The other end of the S-shaped member 6 extends upwardly and bolts 8 secure thereto the transversely extending secondary or shield bar 9 in vertically offset relation to the main impact member 1.

Above the shield section 9 constituting a part of the bumper assembly, is a second shielding member 10 in the form of a sheet metal strip which also extends across the rear of the vehicle and is vertically offset to both bars 1 and 9. The upper edge of the strip 10 is located behind and is secured as by welding or riveting to the rear body wall 2 and constitutes in effect a continuation of the rear wall. As seen particularly in Figure 2 the strip 10 extends downwardly and outwardly with its lower edge beaded or curled inwardly for appearance purposes. Also for the purpose of appearance the bar 9 may be of curved section but it extends generally in the inclined plane containing the shield part 10 and forms a continuation thereof. Likewise the main impact member is of arcuate section and its upper edge turns inwardly in substantial alinement with the inclination of the cooperating shield members.

Thus the slanted shields 9 and 10 overlying the space between the bumper bar 1 and the body wall 2 discourage unauthorized riding on the bumper bar and the arrangement of the shield elements for relative movement upon impact, enables the bumper bar to be positioned in sufficiently spaced relation with the body that it may travel a considerable distance inwardly under impact without damage to the fixed shield 10 or other parts of the vehicle.

I claim:

1. In combination, a body wall, a bumper bar beyond the wall having a substantially vertical impact face the upper edge of which is curved and inclined inwardly, a secondary bumper bar vertically offset above the first mentioned bar and having an inclined face curved upwardly in substantial continuity with the curved face at the upper edge of said first mentioned bar, and a slanted shield fixed to the body wall above said bars with its exposed surface in substantial continuity with faces of both bars.

2. In a vehicle having a back wall, an anti-ride shield fixed to the back wall in vertically inclined relation thereto, a main bumper bar resiliently mounted in horizontally spaced relation to said wall, a secondary bumper bar lying between the upper edge of the main bumper bar and the lower edge of the shield in vertically inclined alinement with the shield and a resilient mounting for the secondary bar accommodating its movement under impact relative to both the shield and the main bumper bar.

3. In a motor vehicle having a body member, a main impact bar spaced horizontally from the body member, a secondary impact bar extending in a vertically inclined plane above and inwardly of the main impact bar, a pair of resilient mounting straps, each having one end secured to said main bar and the opposite end to the secondary bar, mounting means for the intermediate portions of said straps and an anti-ride shield rigid with the body and projected downwardly and outwardly in the inclined plane of the secondary bar.

4. An anti-ride bumper construction for motor vehicles, including a pair of vertically spaced shield members, means rigidly mounting the uppermost member to present its exposed face in a downwardly and outwardly inclined plane with the lower edge thereof terminating in a vertical plane spaced longitudinally of the vertical plane containing the lower member, means resiliently mounting the lower member for deflection under impact, an auxiliary shield occuping the space between said members and having its exposed face in substantial alignment with the faces of said members and its upper edge adjacent the lower edge of the upper member and its lower edge adjacent the upper edge of the lower member for cooperation therewith in presenting a substantially unbroken inclined surface and resilient mounting means for the auxiliary shield.

HOWARD A. FLOGAUS.